US010885000B2

United States Patent
Contessa et al.

(10) Patent No.: US 10,885,000 B2
(45) Date of Patent: *Jan. 5, 2021

(54) REPAIRING CORRUPTED REFERENCES

(71) Applicant: INTERNATIONAL BUSINESS MACHINES CORPORATION, Armonk, NY (US)

(72) Inventors: Luca Contessa, Boca Raton, FL (US); Jeffrey Nils Hagelberg, Ayer, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,874

(22) Filed: Apr. 4, 2019

(65) Prior Publication Data

US 2019/0228000 A1 Jul. 25, 2019

Related U.S. Application Data

(63) Continuation of application No. 14/729,102, filed on Jun. 3, 2015, now Pat. No. 10,289,706.

(51) Int. Cl.
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
None
See application file for complete search history.

(56) References Cited

U.S. PATENT DOCUMENTS 7,260,746 B2   8/2007  Demsky
7,366,740 B2   4/2008  Sleeman
(Continued)

OTHER PUBLICATIONS

Eclipse, "Package org.eclipse.emf.ecore," Eclipse Modeling Framework Documentation, p. 1-5, http://download.eclipse.org/modeling/emf/emf/javadoc/2.9.0/org/eclipse/emf/ecore/package-summary.html, Accessed on May 8, 2015.
(Continued)

*Primary Examiner* — James Trujillo
*Assistant Examiner* — John J Morris
(74) *Attorney, Agent, or Firm* — Michael O'Keefe (57) ABSTRACT

Repairing corrupt database references. Identifying a corrupt reference within a database, whereby the corrupt reference includes a reference with a broken connection between one or more data objects within the database and the corrupt reference is associated with one or more reference corruption types. Recording reference information for the corrupt reference, whereby the reference information includes a location of the corrupt reference within the database and one or more identification numbers of the one or more data objects associated with the corrupt reference. Determining a repair procedure based on the one or more reference corruption types associated with the corrupt reference. Generating one or more lines of computer code associated with the repair procedure and based on the recorded reference information. Executing the one or more lines, whereby the one or more lines are executed in a database manager.

20 Claims, 3 Drawing Sheets

(56) References Cited

U.S. PATENT DOCUMENTS

| | | |
|---|---|---|
| 7,702,695 B2 | 4/2010 | Mehra |
| 7,769,769 B2 | 8/2010 | Rasmussen |
| 8,019,795 B2 | 9/2011 | Anderson |
| 8,051,102 B2 | 11/2011 | Everett |
| 8,386,440 B2 * | 2/2013 | Lomet ................. G06F 11/1474 707/676 |
| 8,539,003 B2 | 9/2013 | Tsyganskiy |
| 2003/0182157 A1 | 9/2003 | Valk |
| 2006/0190503 A1 * | 8/2006 | Naicken .................. G06F 16/27 |
| 2010/0005074 A1 | 1/2010 | Endacott |
| 2011/0276945 A1 | 11/2011 | Chasman |
| 2012/0278290 A1 | 11/2012 | Pinch |
| 2013/0086104 A1 | 4/2013 | Morrison |
| 2016/0357789 A1 | 12/2016 | Contessa |

OTHER PUBLICATIONS

Tang, "Big Data Cleaning," Web Technologies and Applications, 2014, p. 13-24, LNCS vol. 8709, Springer International Publishing.

* cited by examiner

REPAIRING CORRUPTED REFERENCES

FIELD OF INVENTION

The present invention relates generally to the field of computing, and more particularly to database management.

BACKGROUND

Object oriented data may be stored in a relational database. A relation database is collection of one or more tables, or relations, of data organized into rows and columns. Each table in the relational database may include columns that represent categories of information. Each table may also include rows that represent a unique instance of data for a category within a column. For example, a table in a relational database may include information relating to customer information. Each column in the table may display categories of customer information, such as name, address, and telephone number. Each row in the table may display specific instances of each category for each specific customer.

Since a relational database may store data in more than one table, data within separate tables in the relational database may need to be connected through a mapping process to create a reference between specific items of data. A reference relates to a connection between data within a relational database.

SUMMARY

According to one embodiment, a method for repairing corrupt database references is provided. The method may identify a corrupt reference within a database, whereby the corrupt reference includes a reference with a broken connection between one or more data objects within the database and the corrupt reference is associated with one or more reference corruption types. The method also includes recording reference information for the corrupt reference, whereby the reference information includes a location of the corrupt reference within the database and one or more identification numbers of the one or more data objects associated with the corrupt reference. The method further includes determining a repair procedure based on the one or more reference corruption types associated with the corrupt reference. The method also includes generating one or more lines of computer code associated with the repair procedure and based on the recorded reference information. The method also includes executing the one or more lines, whereby the one or more lines are executed in a database manager.

According to another embodiment, a computer system for repairing corrupt database references is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The computer system may identify a corrupt reference within a database, whereby the corrupt reference includes a reference with a broken connection between one or more data objects within the database and the corrupt reference is associated with one or more reference corruption types. The computer system also includes recording reference information for the corrupt reference, whereby the reference information includes a location of the corrupt reference within the database and one or more identification numbers of the one or more data objects associated with the corrupt reference. The computer system further includes determining a repair procedure based on the one or more reference corruption types associated with the corrupt reference. The computer system also includes generating one or more lines of computer code associated with the repair procedure and based on the recorded reference information. The computer system also includes executing the one or more lines, whereby the one or more lines are executed in a database manager.

According to yet another embodiment, a computer program product for repairing corrupt database references is provided. The computer program product may include one or more computer-readable tangible storage medium and program instructions stored on one or more tangible storage medium, the program instructions executable by a processor. The computer program product may include program instructions to identify a corrupt reference within a database, whereby the corrupt reference includes a reference with a broken connection between one or more data objects within the database and the corrupt reference is associated with one or more reference corruption types. The computer program product may also include program instructions to record reference information for the corrupt reference, whereby the reference information includes a location of the corrupt reference within the database and one or more identification numbers of the one or more data objects associated with the corrupt reference. The computer program product may further include program instructions to determine a repair procedure based on the one or more reference corruption types associated with the corrupt reference. The computer program product may also include program instructions to generate one or more lines of computer code associated with the repair procedure and based on the recorded reference information. The computer program product may also include program instructions to execute the one or more lines, whereby the one or more lines are executed in a database manager.

DETAILED DESCRIPTION

Embodiments of the present invention are directed to correcting corrupt references within a relational database.

As previously described, a reference relates to a connection between data within a relational database. The connection between the items of data in a reference may become corrupted when the connection between the data is broken. Prevalent types of reference corruption states include dangling references, abandoned references, and unbalanced references. A dangling reference refers to a reference from a primary key, or a source data object, in one data table to a destination data object in another data table where the destination object does not exist. For example, item of data "123" in Table A may include a reference to item of data "456" in Table B. However, if item of data "456" does not exist in Table B, the reference to item of data "456" in Table B would not be a valid reference due to the nonexistence of item of data "456", and therefore, the reference is a dangling reference. Dangling references may exist when the destination object has been deleted, moved, or the object identification number has been changed.

An abandoned reference refers to a reference with a nonexistent source object. For example, item of data "456" in Table B may include data indicating it is referenced by item of data "123" in Table A. However, if item of data "123" does not exist in Table A, then the data may include a dangling reference. Abandoned references may exist when references are stored in an intermediate table.

An unbalanced reference is a broken bidirectional reference. A bidirectional reference refers to a single link between two data objects that each refer to the other. For example, item of data "123" in Table A refers to item of data "456" in Table B and item of data "456" in Table B reciprocally refers to item of data "123" in Table A. The link between each item of data in a bidirectional reference may be separately stored in a database. Therefore, the bidirectional reference may become broken, or unbalanced, if one of the links changes in a way that creates an inconsistency so that the referenced object no longer refers back to the original object. For example, item of data "123" in Table A refers to item of data "456" in Table B, however, item of data "456" in Table B refers to item of data "789" in Table C.

When a user encounters corrupt references, resolution may take days since the user may be required to contact a help desk and engage in a series of back and forth exchanges to diagnose and correct the corrupt reference. As such, it may be advantageous, among other things, to implement a system that is capable of detecting corrupt references at runtime and automatically correcting detected reference corruptions.

According to one embodiment, structured query language (SQL) scripts may be used to detect corrupted references. SQL is a programming language used for managing data in a relation database. SQL scripts may be used by a diagnostic tool, such as IBM® ISALite Metadata Repository Diagnostic Test® (ISALite Metadata Repository Diagnostic Test is a Registered Trademark of IBM Corp.), to locate inconsistencies in an uncorrupt database. The SQL statements may detect semantic issues arising from mapping logical relationships in objects to links between tables in the database. Once located, a user may designate whether the detected reference corruption should be repaired immediately or recorded in a log file for post-analysis repair. The inconsistencies, or corrupt references, within the uncorrupt database may be repaired by generating repair SQL statements to execute in a database manager. Therefore, embodiments of the present invention may have the capacity to improve the technical field of database management by implementing software that provides a means of automatic runtime detection and repair of corrupt references.

Figure 1:
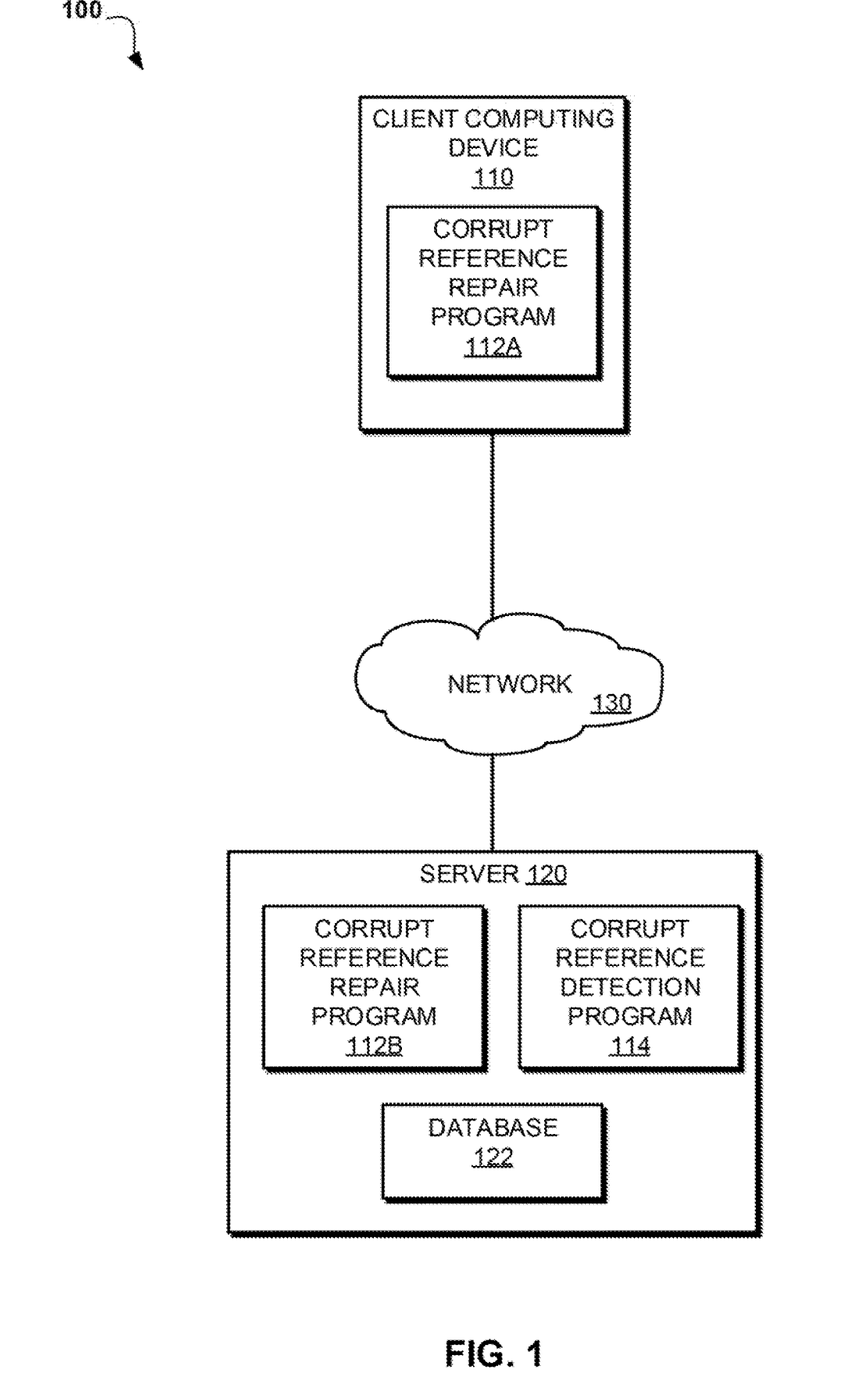
FIG. 1 is an illustration of a networked computer environment, in accordance with one embodiment of the present invention.

Referring now to FIG. 1, an exemplary networked computer environment 100 is depicted, in accordance with one embodiment. The networked computer environment 100 may include a client computing device 110 that is enabled to run corrupt reference repair program 112A. The networked computer environment 100 may also include a server 120 that is enabled to run corrupt reference repair program 112B and a communication network 130. The networked computer environment 100 may include a plurality of client computing devices 110 and servers 120, only one of which is shown for illustrative brevity. According to at least one implementation, the present embodiment may also include a repository, such as database 122, which may be running on server 120. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may communicate with server computer 120 via communications network 130. The communications network 130 may include connections, such as wire, wireless communication links, or fiber optic cables. As will be discussed with reference to FIG. 3, server computer 120 may include internal components 800a and external components 900a, respectively, and client computing device 110 may include internal components 800b and external components 900b, respectively. Client computing device 110 may be, for example, a mobile device, a telephone, a personal digital assistant, a netbook, a laptop computer, a tablet computer, a desktop computer, or any type of computing device capable of running a program and accessing a network.

According to the present embodiment, corrupt reference detection program 114B, such as IBM® ISALite® (ISALite is a Registered Trademark of IBM Corp.) may run on server 120 and detect corrupt references within database 122. In one or more other embodiments, corrupt reference detection program 114A may run on client computing device 110. Corrupt reference detection program 114A, 114B is explained in further detail below with respect to FIG. 2.

According to the present embodiment, a program, such as corrupt reference repair program 112A and 112B may run on client computing device 110 or on server computer 120. Corrupt reference repair program 112A, 112B may repair corrupt references through deleting or reconnecting the references with objects within database 122. The corrupt reference repair method is explained in further detail below with respect to FIG. 2.

Figure 2:
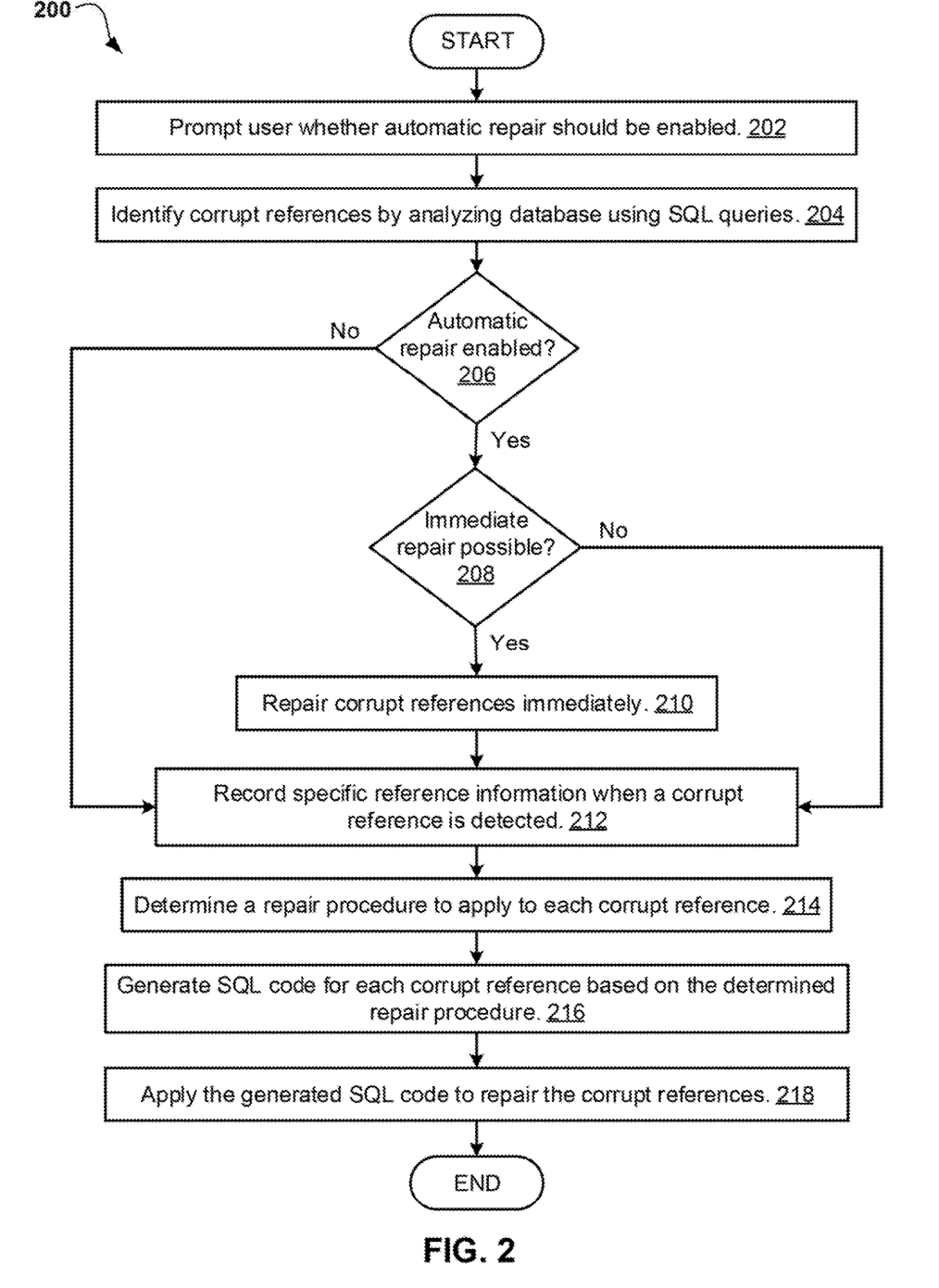
FIG. 2 illustrates a flowchart of the operational steps carried out by a program to repair corrupt references, in accordance with one embodiment of the present invention.

Referring now to FIG. 2, a flowchart 200 of the operational steps carried out by a program to repair corrupt references is depicted, in accordance with one embodiment of the present invention. Corrupt reference detection program 114A, 114B prompts the user to choose whether to enable automatic repair of the corrupt references (step 202). Corrupt reference detection program 114A, 114B may be capable of automatically repairing some types of corrupt references, such as abandoned references.

Corrupt reference detection program 114A, 114B may then identify corrupt references by analyzing database 122 (step 204). Corrupt reference detection program 114A, 114B, such as IBM® ISALite® (ISALite is a Registered Trademark of IBM Corp.) may utilize a diagnostic test, such as IBM® XMETA® Diagnostic Test (XMETA Diagnostic Test is a Registered Trademark of IBM Corp.), to identify the corrupt references within database 122. The diagnostic test may identify different types of corrupt references, such as abandoned references, dangling references, and unbalanced references. The diagnostic test may generate queries in structured query language (SQL) to detect the tables within database 122 that store reference objects. Within the tables in database 122 that store reference objects, the diagnostic test may identify the reference identification numbers of the reference objects that are referenced by other objects. By pinpointing the location of each reference object, the diagnostic test is utilized by corrupt reference detection program 114A, 114B to determine the existence of corrupt references. For example, if the diagnostic test determines a reference object is not referenced by a valid source, an abandoned reference exists. Similarly, if the diagnostic test determines a reference object does not reference to a valid destination, a dangling reference exists. Additionally, if the diagnostic test determines reference objects in a bidirectional reference do not link back to each other, an unbalanced reference exists. Corrupt reference detection program 114A, 114B may be capable of determining the presence of a particular type of reference, such as a dangling reference, abandoned reference, or unbalanced reference, based on the structure of the coding language used to build database 122. For example, if corrupt reference detection program 114A, 114B determines a unidirectional reference has an improper destination data object, then corrupt reference detection program 114A, 114B may determine the reference is a dangling reference.

Once corrupt reference detection program 114A, 114B identifies the corrupt references, corrupt reference detection program 114A, 114B determines whether the user chose to automatically repair corrupt references when the corrupt references are identified (step 206). If the user did not enable automatic repair of corrupt references (step 206, "NO" branch), corrupt reference detection program 114A, 114B may record reference information associated with each identified corrupt reference in a text file in preparation for post analysis repair by corrupt reference repair program 112A, 112B (step 212). If the user did enable automatic repair of corrupt references (step 206, "YES" branch), corrupt reference detection program 114A, 114B may determine whether immediate repair of each identified corrupt reference is possible (step 208).

If corrupt reference detection program 114A, 114B determines a detected corrupt reference can be repaired immediately (step 208, "YES" branch), corrupt reference detection program 114A, 114B immediately repairs the detected corrupt reference (step 210). As previously described, a detected corrupt reference may be immediately repaired by corrupt reference detection program 114A, 114B if the detected corrupt reference can be repaired without affecting previously repaired references. For example, if a dangling reference exists between item of data "123" and item of data "456," corrupt reference detection program 114A, 114B may immediately repair the dangling reference if repairing the dangling reference would not conflict with a reference involved in a previous repair. Furthermore, corrupt reference detection program 114A, 114B may not immediately repair detected corrupt references that involve multiple corruptions. For example, if a reference exists between item of data "123" and item of data "456" and another reference exists between item of data "123" and item of data "789" but both references are dangling references, corrupt reference detection program 114A, 114B may not be capable of immediately repairing both dangling references since item of data "123" is involved in each reference and, therefore, a conflict may occur when corrupt reference detection program 114A, 114B attempts to repair each reference.

When a corrupt reference is identified by corrupt reference detection program 114A, 114B and either the user decides not to have the identified corrupt reference automatically repaired (step 206, "NO" branch), corrupt reference detection program 114A, 114B determines the detected corrupt reference cannot be repaired immediately (step 208, "NO" branch) or corrupt reference detection program has repaired all corrupt references capable of automatic repair (step 210), corrupt reference detection program 114A, 114B records reference information for the detected corrupt reference (step 212). Since not all corrupt references may be repaired immediately, corrupt reference detection program 114A, 114B may record corrupt reference information into a text file, such as an XML file or a batch file, for post-analysis repair by corrupt reference repair program 112A, 112B. For example, if corrupt reference detection program 114A, 114B is not able to repair a dangling reference between item of data "123" and item of data "456" immediately upon detection, corrupt reference detection program 114A, 114B will record the dangling reference in a text file for post-analysis processing by corrupt reference repair program 112A, 112B. In the text file report, corrupt reference detection program 114A, 114B may include a record of the repaired references that corrupt reference detection program 114A, 114B was able to immediately repair. The text file report containing the log of corrupt references and repaired references may be stored on client computing device 110, on server 120, or on a data storage device, such as a universal serial bus (USB) drive, to transfer to a system hosting corrupt reference repair program 112A, 112B. Additionally, corrupt reference detection program 114A, 114B may record reference information for each corruption depending on the type of corruption. For example, for dangling references, corrupt reference detection program 114A, 114B may collect the location of the reference within the model database, the identification numbers of the objects involved in the reference, and the object-relational mapping information of the objects in the reference. Furthermore, for unbalanced references, corrupt reference detection program 114A, 114B may collect the location of the involved references in the model in both directions of the reference, the identification number of the object with the unbalanced reference, the identification number of the referenced object, the set of objects referenced by the object with the unbalanced reference, the set of objects referenced by the referenced object, the set of objects that reference the object with the unbalanced reference, and the set of objects that reference the referenced object. Corrupt reference repair program 112A, 112B may use the recorded reference information when repairing each corrupt reference.

Corrupt reference repair program 112A, 112B then determines a repair procedure to apply for each corrupt reference in the text file report that was not immediately repaired when detected by corrupt reference detection program 114A, 114B (step 214). By definition, corrupt reference repair program 112A, 112B may access the text file after a period of time following creation of the text file to begin post-analysis repairs of the corrupt references not repaired immediately upon detection by corrupt reference detection program 114A, 114B. Furthermore, the system hosting corrupt reference repair program 112A, 112B, such as client computing device 110 or server 120, may upload the text file while connected to network 130 so that post-analysis repairs to database 122 may be made when the host system is not connected to network 130. As previously described, the text file may be uploaded to the system hosting corrupt reference repair program 112A, 112B using a data storage device, such as a universal serial bus (USB) drive.

Corrupt reference repair program 112A, 112B may parse through the text file report to identify each corrupt reference that was not repaired immediately when detected by corrupt reference detection program 114A, 114B. Corrupt reference repair program 112A, 112B may be preconfigured with a list of possible repair procedures for each possible corrupt reference type. A repair procedure may be a series of steps executed to repair a corrupt reference. For example, potential repair procedures for repairing a dangling reference may include disconnecting the reference, changing the reference to point to a new object, or deleting the reference. Furthermore, repair procedures for repairing an abandoned reference may include deleting the reference. Additionally, repair procedures for an unbalanced reference may include preserving one of the references or deleting both of the references.

When repairing a dangling reference, the one method of repair may be to disconnect the reference. Disconnecting the reference may be approached differently depending on whether the source object of the reference is in a column within the same table as the destination object or whether the source object is stored in a separate table from the destination object. If the source object is represented as a column in the same table as the destination object, the column containing the source object may be nulled. If the source object is stored in a separate table from the destination object, the row containing the reference information may be deleted.

A dangling reference may also be repaired by changing the reference to point to a new object. For example, item of data "123" in Table A refers to item of data "456" in Table B, however, item of data "123" should refer to item of data "789" in Table C. Item of data "123" can be repaired by changing the reference to point to item of data "789." Changing the reference to point to a new object may only be available when a field cannot be nulled due to a lower bound constraint.

Another means of repairing a dangling reference may be to delete the object containing the reference. For example, if item of data "123" in Table A refers to item of data "456" in Table B but should refer to item of data "789" in Table C. Item of data "123" may be repaired by simply deleting item of data "123." Deleting the object containing the dangling reference may only be possible when the object is not otherwise needed, such as when the information within the object is not referenced by other objects.

Abandoned references may only be repaired by deleting the object containing the reference. As previously described, an abandoned reference refers to a reference with a nonexistent source object. Since the primary key does not exist, the abandoned reference may only be repaired by deleting the reference information. For example, if item of data "456" in Table B includes primary key information indicating item of data "123" in Table A is the source object and item of data "123" does not exist in Table A, item of data "456" would be categorized as an abandoned reference and corrupt reference repair program 112A, 112B would repair this abandoned reference by deleting the reference linking item of data "456" to nonexistent item of data "123" in Table A.

As previously described, an unbalanced reference is a broken bidirectional reference. For example, item of data "123" in Table A refers to item of data "456" in Table B, however, item of data "456" in Table B refers to item of data "789" in Table C rather than properly referring back to item of data "123." An unbalanced reference may be repaired by either preserving one of the references or by deleting both of the references. A reference may be preserved by amending the reference to be a reciprocal version of the other reference in the unbalanced reference. For example, in the above example, the reference between item of data "123" and item of data "456" may be preserved and the reference between item of data "456" and item of data "789" would be revised so that item of data "456" references back to item of data "123." Alternatively, the reference between item of data "456" and item of data "789" may be persevered and the reference between item of data "123" and item of data "456" may be revised so that item of data "789" references back to item of data "456."

An unbalanced reference may also be repaired by deleting one of the references. For example, in the above example, the unbalanced reference may be repaired by either deleting the reference between item of data "123" and item of data "456," the reference between item of data "456" and item or data "789," or both references.

For each identified corrupt reference, corrupt reference repair program 112A, 112B may prompt a user with the preconfigured list of possible repairs for the corruption type of the identified corrupt reference. For example, if corrupt reference repair program 112A, 112B identifies a dangling reference in the text file report, corrupt reference repair program 112A, 112B will prompt a user to select whether the user wishes to disconnect the reference, change the reference to point to a new object, or delete the reference. If corrupt reference repair program 112A, 112B determines a particular repair procedure is not possible for a specific reference or a specific reference type, corrupt reference repair program 112A, 112B will not prompt the user with the particular repair procedure unavailable for the corrupt reference. For example, if corrupt reference repair program 112A, 112B determines a dangling reference cannot be disconnected, corrupt reference repair program 112A, 112B would only present the user with the options to change the reference to point to a new object or to delete the reference. When corrupt reference repair program 112A, 112B performs post-analysis repairs of the detected corrupt references, corrupt reference repair program 112A, 112B may analyze the record of immediately repaired references so post-analysis repairs made by corrupt reference repair program 112A, 112B do not affect repairs previously made by corrupt reference detection program 114A, 114B. Corrupt reference repair program 112A, 112B may not present repair procedures to the user if that repair procedure may produce additional corruption within database 122 or may conflict with previous repairs made to database 122 by either corrupt reference repair program 112A, 112B or corrupt reference detection program 114A, 114B.

In another embodiment of the present invention, corrupt reference repair program 112A, 112B may use backtracking algorithms to automatically select the repair procedure to implement based on a user preconfigured priority list of repair procedures. Backtracking algorithms are general algorithms implemented to uncover solutions for computational problems, such as constraint satisfaction problems, that builds candidate solutions and incrementally eliminates candidates until a viable solution is located. For example, a user may preconfigure corrupt reference repair program 112A, 112B to prioritize repairing dangling references by first attempting to null out the reference and then deleting the reference. Therefore, corrupt reference repair program 112A, 112B may first attempt to null out the reference as a means of repairing the dangling reference and, if nulling out the reference is not possible, corrupt reference repair program 112A, 112B may repair the corrupt reference by deleting the reference altogether.

Corrupt reference repair program 112A, 112B may determine whether a repair procedure conflicts with a previous repair by analyzing previous repairs to determine whether repairing a corrupt reference creates a conflict with any previous repair. For example, if corrupt reference repair program 112A, 112B determines that nulling out a reference will corrupt a previously repaired reference, corrupt reference repair program 112A, 112B may advance to the next repair procedure to determine whether the next repair procedure in the priority list repairs the corrupt reference without corrupting previously repaired references. Furthermore, if none of the repair procedures on the priority list adequately repairs the corrupt reference without corrupting a previously repaired reference, corrupt reference repair program 112A, 112B may not repair the corrupt reference, since later repairs to other corrupt references within the text file may fix the present corrupt reference. For example, if corrupt reference repair program 112A, 112B was not able to repair a reference between item of data "123" and item of data "456" since a conflict with a previously repaired reference arose for each repair procedure, corrupt reference repair program 112A, 112B may advance to the next corrupt reference within the text file since repairing a later corrupt reference within the text file may also correct the reference between item of data "123" and item of data "456."

After examining the identified corrupt references, corrupt reference repair program 112A, 112B may have skipped over several corrupt references due to repair conflicts with repaired references. The conflicts may result in some corrupt references not being assigned a repair procedure. Therefore, when not all corrupt references have been assigned a repair procedure, corrupt reference repair program 112A, 112B may abandon the priority list of repair procedures and reevaluate each corrupt reference without an assigned repair procedure until each corrupt reference is assigned a valid repair procedure. For example, if a user has selected the only repair procedure as point the reference to the correct destination object and corrupt reference repair program 112A, 112B was unable to assign a repair procedure to dangling reference A due to a conflict with a repaired reference, corrupt reference repair program 112A, 112B may abandon the user selected repair procedure and reexamine dangling reference A to determine is another type of repair procedure is capable of repairing dangling reference A without creating a conflict with a repaired reference.

Corrupt reference repair program 112A, 112B may then generate SQL code to repair each detected corrupt reference in the text file report based on the determined repair procedure (step 216). SQL code may be generated to repair each detected corrupt reference depending on the type of corrupt reference. For example, if a dangling reference has been identified, corrupt reference repair program 112A, 112B will generate SQL code to repair the dangling reference depending on the objects used to make the reference. When generating SQL code for each corrupt reference, corrupt reference repair program 112A, 112B may monitor repaired references to determine whether a repair to a specific reference interferes with a repair to another corrupt reference. For example, if reference A and reference B are identified as corrupt and reference A has been repaired, corrupt reference repair program 112A, 112B may not repair reference B if repairing reference B would somehow create a new corruption of reference A. Once corrupt reference repair program 112A, 112B generated the SQL code to repair the corrupt references, the generated SQL code is saved within the text file report.

The text file report with the generated SQL code needed to repair the corrupt references is then executed against database 122 (step 218). Using run commands on the database manager, the user may import the generated SQL statements to repair the corrupt references within database 122. For example, when a text file containing SQL statements to repair a dangling reference is imported to a computer by a user, the user may import the text file and run the SQL statements in the database manager to repair the corrupt references within database 122.

Figure 3:
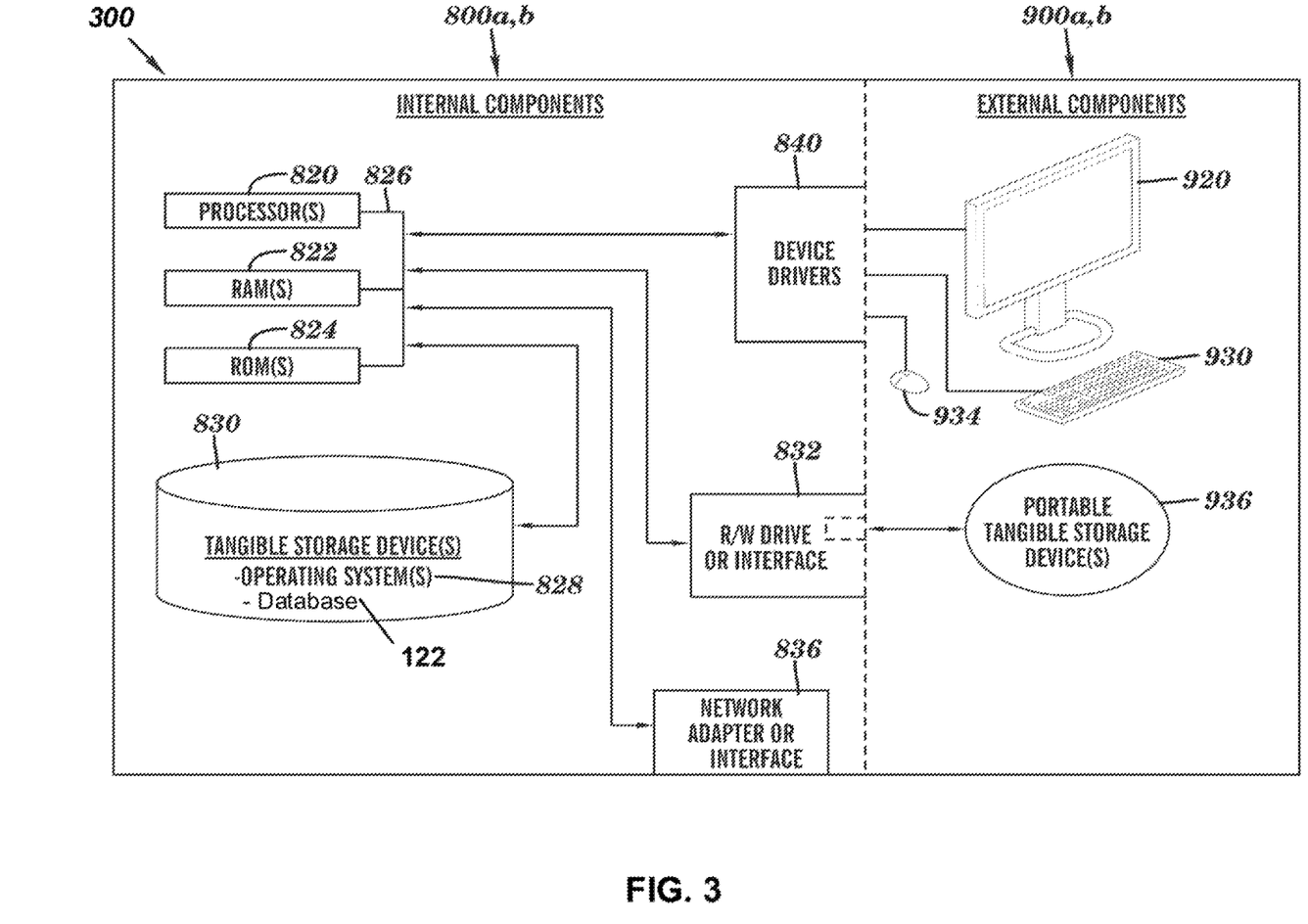
FIG. 3 is a block diagram depicting the hardware components of the corrupt reference correction system of FIG. 1, in accordance with an embodiment of the invention.

FIG. 3 is a block diagram 300 of internal and external components of computer 110 and server 120 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110, and network server 120 may include respective sets of internal components 800 *a, b* and external components 900 *a, b* illustrated in FIG. 3. Each of the sets of internal components 800 *a, b* includes one or more processors 820, one or more computer-readable RAMs 822 and one or more computer-readable ROMs 824 on one or more buses 826, and one or more operating systems 828, one or more databases 122 and one or more computer-readable tangible storage devices 830. The one or more operating systems 828 and the corrupt reference repair program 112A and corrupt reference detection program 114A in client computer 110 and corrupt reference repair program 112B and corrupt reference detection program 114B in network server computer 120 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as corrupt reference repair program 112A and 112B, can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The corrupt reference repair program 112A in client computer 110 and the corrupt reference repair program 112B in network server 120 can be downloaded to client computer 110 from an external computer via a network (for example, the Internet, a local area network or other, wide area network) and respective network adapters or interfaces 836. From the network adapters or interfaces 836, the corrupt reference repair program 112A in client computer 110 and the corrupt reference repair program 112B in network server computer 120 are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed in accordance with the present invention. However, numerous modifications and substitutions can be made without deviating from the scope of the present invention. Therefore, the present invention has been disclosed by way of example and not limitation.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A method for repairing corrupt database references, the method comprising:
    identifying, by a computer, one or more corrupt references within a database based on a diagnostic test, wherein the one or more corrupt references includes a reference with a broken connection between two or more data objects within the database, and wherein the one or more corrupt references have an associated reference corruption type that is determined based on a structure of a plurality of coding language used to build the database, and wherein the diagnostic test generates queries in structured query language (SQL) to detect tables within the database that store reference objects;
    determining, by the computer, a repair procedure using a backtracking algorithm, wherein the backtracking algorithm determines the repair procedure based on a user preconfigured priority list of repair procedures; and
    executing, by the computer, the repair procedure, wherein a list of preceding repairs to corrupt references is analyzed to ensure execution of the repair procedure does not affect any preceding repair of a corrupt reference, and wherein the execution of the repair procedure comprises generating SQL code to repair each detected corrupt reference in a text file.

2. The method of claim 1, wherein the associated reference corruption type includes an abandoned reference, a dangling reference, and an unbalanced reference, and wherein the abandoned reference includes a destination data object referenced by an improper source data object, and wherein the dangling reference includes source data object referencing an improper destination data object, and wherein the unbalanced reference includes a bidirectional reference with at least one broken connection.

3. The method of claim 1, further comprising:
    repairing, by the computer, the one or more identified corrupt references, wherein repairing the one or more identified corrupt references further comprises determining the one or more data objects associated with the one or more identified corrupt references are not associated with one or more other corrupt references and determining a conflict is not created by repairing the one or more identified corrupt references.

4. The method of claim 1, wherein the repair procedure is selected from a group consisting of nulling out the one or more corrupt references associated with the one or more data objects, editing the reference information associated with the one or more corrupt references to replace a first set of data objects of the two or more data objects with a second set of data objects of the two or more data objects, and deleting the one or more corrupt references.

5. The method of claim 1, wherein recording the reference information further comprises generating a text file and saving the reference information to the generated text file, and wherein the text file includes at least one of a batch file and an extensible markup language file.

6. The method of claim 1, wherein determining the repair procedure is based on one of a user preconfigured priority list of one or more repair procedures and determining the repair procedure based on a user selected repair procedure from a list, wherein the list includes one or more repair procedures.

7. The method of claim 1, wherein the one or more corrupt references includes a first data object and a second data object, and wherein recording the reference information includes recording reference information for the first and the second data objects, and wherein determining the repair procedure includes determining a first repair procedure corresponding to the first data object and a second repair procedure corresponding to the second data object after recording the reference information for the first and the second data objects.

8. A computer system for repairing corrupt database references, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    identifying, by a computer, one or more corrupt references within a database based on a diagnostic test, wherein the one or more corrupt references includes a reference with a broken connection between two or more data objects within the database, and wherein the one or more corrupt references have an associated reference corruption type that is determined based on a structure of a plurality of coding language used to build the database, and wherein the diagnostic test generates queries in structured query language (SQL) to detect tables within the database that store reference objects;
    determining, by the computer, a repair procedure using a backtracking algorithm, wherein the backtracking algorithm determines the repair procedure based on a user preconfigured priority list of repair procedures; and
    executing, by the computer, the repair procedure, wherein a list of preceding repairs to corrupt references is analyzed to ensure execution of the repair procedure does not affect any preceding repair of a corrupt reference, and wherein the execution of the repair procedure comprises generating SQL code to repair each detected corrupt reference in a text file.

9. The computer system of claim 8, wherein the associated reference corruption type includes an abandoned reference, a dangling reference, and an unbalanced reference, and wherein the abandoned reference includes a destination data object referenced by an improper source data object, and wherein the dangling reference includes source data object referencing an improper destination data object, and wherein the unbalanced reference includes a bidirectional reference with at least one broken connection.

10. The computer system of claim 8, further comprising:
repairing, by the computer, the one or more identified corrupt references, wherein repairing the one or more identified corrupt references further comprises determining the one or more data objects associated with the one or more identified corrupt references are not associated with one or more other corrupt references and determining a conflict is not created by repairing the one or more identified corrupt references.

11. The computer system of claim 8, wherein the repair procedure is selected from a group consisting of nulling out the one or more corrupt references associated with the one or more data objects, editing the reference information associated with the one or more corrupt references to replace a first set of data objects of the two or more data objects with a second set of data objects of the two or more data objects, and deleting the one or more corrupt references.

12. The computer system of claim 8, wherein recording the reference information further comprises generating a text file and saving the reference information to the generated text file, and wherein the text file includes at least one of a batch file and an extensible markup language file.

13. The computer system of claim 8, wherein determining the repair procedure is based on one of a user preconfigured priority list of one or more repair procedures and determining the repair procedure based on a user selected repair procedure from a list, wherein the list includes one or more repair procedures.

14. The computer system of claim 8, wherein the one or more corrupt references includes a first data object and a second data object, and wherein recording the reference information includes recording reference information for the first and the second data objects, and wherein determining the repair procedure includes determining a first repair procedure corresponding to the first data object and a second repair procedure corresponding to the second data object after recording the reference information for the first and the second data objects.

15. A computer program product for repairing corrupt database references, the computer program product comprising:
one or more computer-readable non-transitory tangible storage media and program instructions stored on at least one of the one or more non-transitory tangible storage media, the program instructions executable by a processor capable of performing a method, the method comprising:
identifying, by a computer, one or more corrupt references within a database based on a diagnostic test, wherein the one or more corrupt references includes a reference with a broken connection between two or more data objects within the database, and wherein the one or more corrupt references have an associated reference corruption type that is determined based on a structure of a plurality of coding language used to build the database, and wherein the diagnostic test generates queries in structured query language (SQL) to detect tables within the database that store reference objects;
determining, by the computer, a repair procedure using a backtracking algorithm, wherein the backtracking algorithm determines the repair procedure based on a user preconfigured priority list of repair procedures; and
executing, by the computer, the repair procedure, wherein a list of preceding repairs to corrupt references is analyzed to ensure execution of the repair procedure does not affect any preceding repair of a corrupt reference, and wherein the execution of the repair procedure comprises generating SQL code to repair each detected corrupt reference in a text file.

16. The computer program product of claim 15, wherein the associated reference corruption type includes an abandoned reference, a dangling reference, and an unbalanced reference, and wherein the abandoned reference includes a destination data object referenced by an improper source data object, and wherein the dangling reference includes source data object referencing an improper destination data object, and wherein the unbalanced reference includes a bidirectional reference with at least one broken connection.

17. The computer program product of claim 15, further comprising:
repairing, by the computer, the one or more identified corrupt references, wherein repairing the one or more identified corrupt references further comprises determining the one or more data objects associated with the one or more identified corrupt references are not associated with one or more other corrupt references and determining a conflict is not created by repairing the one or more identified corrupt references.

18. The computer program product of claim 15, wherein the repair procedure is selected from a group consisting of nulling out the one or more corrupt references associated with the one or more data objects, editing the reference information associated with the one or more corrupt references to replace a first set of data objects of the two or more data objects with a second set of data objects of the two or more data objects, and deleting the one or more corrupt references.

19. The computer program product of claim 15, wherein recording the reference information further comprises generating a text file and saving the reference information to the generated text file, and wherein the text file includes at least one of a batch file and an extensible markup language file.

20. The computer program product of claim 15, wherein determining the repair procedure is based on one of a user preconfigured priority list of one or more repair procedures and determining the repair procedure based on a user selected repair procedure from a list, wherein the list includes one or more repair procedures.

* * * * *